(12) United States Patent
Jian

(10) Patent No.: US 12,418,205 B2
(45) Date of Patent: Sep. 16, 2025

(54) MOTOR

(71) Applicant: SUNON ELECTRONICS (BEIHAI) CO., LTD., Guangxi (CN)

(72) Inventor: Wei-Qian Jian, Kaohsiung (TW)

(73) Assignee: SUNON ELECTRONICS (BEIHAI) CO., LTD., Beihai (CN)

( * ) Notice: Subject to any disclaimer, the term of this patent is extended or adjusted under 35 U.S.C. 154(b) by 264 days.

(21) Appl. No.: 18/155,150

(22) Filed: Jan. 17, 2023

(65) Prior Publication Data

US 2024/0006937 A1 Jan. 4, 2024

(30) Foreign Application Priority Data

Jul. 4, 2022 (TW) .................. 111124978

(51) Int. Cl.
*H02K 1/17* (2006.01)
*H02K 1/18* (2006.01)
*H02K 5/04* (2006.01)

(52) U.S. Cl.
CPC .................. *H02K 1/18* (2013.01); *H02K 1/17* (2013.01); *H02K 5/04* (2013.01)

(58) Field of Classification Search
CPC .. H02K 1/02; H02K 1/06; H02K 1/12; H02K 1/14; H02K 1/141; H02K 1/146; H02K 1/148; H02K 1/16; H02K 1/17; H02K 1/18; H02K 1/185; H02K 1/187; H02K 1/20; H02K 1/27; H02K 1/30; H02K 5/00; H02K 5/04; H02K 5/06; H02K 5/17; H02K 5/173; H02K 5/1732; H02K 5/22; H02K 5/24; H02K 7/00; H02K 7/003; H02K 7/08; H02K 7/14; H02K 7/18; H02K 7/1838; H02K 9/19; H02K 9/197; H02K 15/02; H02K 15/028; H02K 15/08; H02K 15/085; H02K 15/16; H02K 15/35

See application file for complete search history.

(56) References Cited

U.S. PATENT DOCUMENTS

| | | | |
|---|---|---|---|
| 4,837,471 A | * | 6/1989 | Kostoss ................. H02K 1/185 |
| | | | 310/227 |
| 6,927,524 B2 | | 8/2005 | Pyntikov et al. |
| 8,860,287 B2 | | 10/2014 | Longtin et al. |
| 11,394,255 B2 | | 7/2022 | Pilgrim et al. |

(Continued)

FOREIGN PATENT DOCUMENTS

| | | |
|---|---|---|
| CN | 202663218 U | 1/2013 |
| CN | 207926297 U | 9/2018 |

(Continued)

*Primary Examiner* — Tran N Nguyen
(74) *Attorney, Agent, or Firm* — WPAT, PC

(57) ABSTRACT

A motor includes a casing, a stator, and a rotor. The casing includes an inner periphery having a plurality of first assembling structures. The stator is disposed on the casing and includes a plurality of magnetic pole modules each of which is independently separable. Each of the plurality of magnetic pole modules includes at least one second assembling structure. Each of the plurality of magnetic pole modules is detachably coupled in an axial direction to the casing by coupling each of the at least one second assembling structure to an associated one of the plurality of first assembling structures. The rotor is rotatably disposed within the stator. An air gap is formed between the rotor and the stator.

9 Claims, 12 Drawing Sheets

(56) References Cited

U.S. PATENT DOCUMENTS

| | | | |
|---|---|---|---|
| 11,496,008 | B2 | 11/2022 | Georgiou et al. |
| 11,831,201 | B2 | 11/2023 | Yang et al. |
| 11,916,435 | B2 | 2/2024 | Pilgrim et al. |
| 2007/0273239 | A1* | 11/2007 | Kobayashi ............. H02K 1/185 310/216.044 |
| 2012/0133145 | A1* | 5/2012 | Longtin ................. H02K 1/185 290/55 |
| 2020/0381962 | A1* | 12/2020 | Georgiou ................ H02K 1/16 |
| 2022/0077727 | A1* | 3/2022 | Pilgrim ................... H02K 9/19 |

FOREIGN PATENT DOCUMENTS

| | | |
|---|---|---|
| CN | 213585297 U | 6/2021 |
| CN | 216489942 U | 5/2022 |
| EP | 0313392 B1 | 12/1993 |
| JP | 2003023738 A | 1/2003 |
| JP | 2005510995 A | 4/2005 |
| JP | 2005278333 A | 10/2005 |
| JP | 2021164217 A | 10/2021 |

\* cited by examiner

MOTOR

CROSS REFERENCE TO RELATED APPLICATION

The application claims the benefit of Taiwan application Ser. No. 111124978, filed on Jul. 4, 2022, and the entire contents of which are incorporated herein by reference.

BACKGROUND OF THE INVENTION

1. Field of the Invention

The present invention relates to a motor and, more particularly, to a motor permitting independent replacement of a magnetic pole module.

2. Description of the Related Art

A conventional motor includes a stator and a rotor. The stator is assembled on a casing of the motor. The stator includes a plurality of iron cores and a coil unit. Each iron core is integrally formed by pressing to form an annular member. The coil unit is wound around the plurality of iron cores forming the annular member. Each iron core includes a magnetic yoke and a pole shoe. Each two adjacent magnetic yokes are connected with each other. Each two adjacent pole shoes have a spacing therebetween. The rotor is rotatably mounted in a space delimited by the pole shoes. An air gap is formed between an outer periphery of the rotor and the pole shoes of the stator, so that the rotor can rotate smoothly relative to the stator.

In the above conventional motor, since each iron core is integrally formed by pressing to form an annular member, after the coil unit is wound around each iron core, the iron cores wound by the coil units are assembled to the casing. However, if the size of the above conventional motor is larger, the size of the mold for the integrally formed iron cores will also be large, resulting in higher costs for the iron core mold. Furthermore, manufacturing is not easy, as wire winding of the integrally formed iron cores is required. Moreover, after the above conventional motor has been used for a period of time, when the stator and the casing become locally loose after long-term operation of the motor, the iron cores which form an annular member as a whole must be adjusted and assembled again. Alternatively, in a case that any one of the coil units of the stator is damaged, the iron cores which form an annular member as a whole must be detached in order to remove the damaged coil unit from the iron cores, resulting in inconvenience in assembly and disassembly.

Thus, it is necessary to improve the conventional motor.

SUMMARY OF THE INVENTION

To solve the above problem, it is an objective of the present invention to provide a motor which permits removal of a single magnetic pole module for replacement or maintenance while permitting easy assembly and disassembly.

It is another objective of the present invention to provide a motor which can reduce the manufacturing costs.

It is a further objective of the present invention to provide a motor which permits stable coupling between the stator and the casing.

It is still another objective of the present invention to provide a motor which permits easy removal of the magnetic pole modules As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "engagement", "coupling", "assembly", or similar terms is used to include separation of connected members without destroying the members after connection or inseparable connection of the members after connection. A person having ordinary skill in the art would be able to select according to desired demands in the material or assembly of the members to be connected.

A motor according to the present invention includes a casing, a stator, and a rotor. The casing includes an inner periphery having a plurality of first assembling structures. The stator is disposed on the casing and includes a plurality of magnetic pole modules each of which is independently separable. Each of the plurality of magnetic pole modules includes at least one second assembling structure. Each second assembling structure is detachably coupled in an axial direction to an associated one of the plurality of first assembling structures. The rotor is rotatably disposed within the stator. An air gap is formed between the rotor and the stator.

Thus, in the motor according to the present invention, the stator includes a plurality of independently separable magnetic pole modules each having at least one second assembling structure. Each magnetic pole module may be axially and detachably coupled to the casing by coupling each second assembling structure to an associated first assembling structure of the casing. When one of the plurality of magnetic pole modules of the stator is damaged, the damaged magnetic pole module may be removed alone for replacement or maintenance. After maintenance, by the provision of each second assembling structure and the associated first assembling structure, the repaired magnetic pole module can be easily reassembled to the casing, which may avoid adverse influence on the arrangement of the other magnetic pole modules near the repaired magnetic pole module, permitting easy assembly and disassembly.

In an example, each of the plurality of magnetic pole modules may include an outer face and an inner face. Each outer face may be adjacent to an associated one of the plurality of first assembling structures. Each inner face may be remote from the associated first assembling structure. Thus, the second assembling structures of the plurality of magnetic pole modules can be easily coupled with the plurality of first assembling structures, which is convenient in assembly.

In an example, each of the plurality of first assembling structures may include a post having two axial end faces opposite to each other. The post of each of the plurality of first assembling structures may include two guiding grooves extending through the two axial end faces. Each second assembling structure may include a protrusion which can be engaged with an associated one of the two guiding grooves of an associated first assembling structure. Thus, each of the plurality of magnetic pole modules can be assembled between two adjacent first assembling structures, which is convenient in assembly.

In an example, the post of each of the plurality of first assembling structures may include two engaging holes respectively formed on the two axial end faces. The two engaging holes may be located between the two guiding grooves. Thus, the structure is simple and easy to manufacture, thereby reducing the manufacturing costs.

In an example, the casing may include a first casing part formed of a plurality of arcuate blocks connected to each other. The plurality of arcuate blocks may together tightly clamp the plurality of magnetic pole modules of the stator. Thus, the plurality of magnetic pole modules can avoid from becoming loose, such that the plurality of magnetic pole modules of the stator can be stably coupled.

In an example, each of the plurality of arcuate blocks may include two lugs. Each of the two lugs of each of the plurality of arcuate blocks is aligned with one of the two lugs of an adjacent arcuate block. Each pair of aligned lugs is coupled by a fastening unit. Thus, the structure is simple and easy to assemble.

In an example, each of the plurality of first assembling structures may include two channels and a limiting column formed between the two channels. Each second assembling structure may include two hooked columns and a limiting groove formed between the two hooked columns. The two hooked columns may engage with the two channels. The limiting column may engage with the limiting groove. Thus, by the provision of the second assembling structures, each of the plurality of magnetic pole modules can be detachably coupled between two adjacent first assembling structures in the axial direction, which is convenient in assembly.

In an example, each of the plurality of first assembling structures may include a slot and a pin. The pins may be disposed on a first casing part and a second casing part of the casing. Each second assembling structure may include a hollow column. Each hollow column may be aligned with an associated pin. Thus, during assembly, the hollow column of each second assembling structure axially engages with an associated pin of the first casing part aligned with the hollow column. Then, the pins of the second casing part axially engage with the hollow columns of the second assembling structures aligned with the pins, such that the pins respectively extend into the hollow columns of the second assembling structures, thereby stably coupling the casing with the stator.

In an example, each pin located on the first casing part may be received in an associated slot. Thus, the structure is simple and easy to manufacture, thereby reducing the manufacturing costs.

In an example, each pin located on the first casing part may include an end connected to the first casing part and another end facing the second casing part. Each pin located on the second casing part may include an end connected to the second casing part and another end facing the first casing part. Thus, the structure is simple and easy to manufacture, thereby reducing the manufacturing costs.

In an example, the motor may further include a plurality of fixing units axially coupled with the casing and the stator. Thus, the plurality of magnetic pole modules can be stably coupled to the casing, such that the stator and the casing can be stably coupled.

In an example, each of the plurality of fixing units may include a pressing member and a positioning member. Each pressing member may include a padding portion and two pressing portions. The two pressing portions are connected to the padding portion and press against an upper face or a lower face of an associated second assembling structure. The positioning member may extend through the padding portion and engage with an engaging hole of an associated one of the plurality of first assembling structures. Thus, it is assured that the plurality of magnetic pole modules can be stably coupled with the casing to effectively prevent the plurality of magnetic pole modules from displacing relative to or falling from the casing.

In an example, each of the plurality of fixing units may include a pressing member and a positioning member. Each pressing member may include a padding board portion and a pressing board portion. A connecting board may be connected between the padding board portion and the pressing board portion. Each pressing board portion presses against an upper face or a lower face of an associated second assembling structure. The positioning member may extend through the padding board portion and engage with a mounting hole of the casing. Thus, it is assured that the plurality of magnetic pole modules can be stably coupled with the casing to effectively prevent the plurality of magnetic pole modules from displacing relative to or falling from the casing.

In an example, the motor may further include a plurality of fasteners. The plurality of fasteners may extend through the casing and press against the plurality of magnetic pole modules, respectively. Thus, after assembly, the stator will not rotate relative to the casing to effectively prevent the plurality of magnetic pole modules from displacing relative to or falling from the casing.

In an example, the casing may include a plurality of radial through-holes. The plurality of fasteners may extend through and engage with the plurality of radial through-holes, respectively. Thus, the structure is simple and easy to manufacture, thereby reducing the manufacturing costs.

In an example, the motor may further include a plurality of blocks. Each of the plurality of blocks is disposed on an associated one of the plurality of magnetic pole modules. A push member extends through a through-hole of the casing and is configured to push one of the plurality of blocks. Thus, the plurality of magnetic pole modules can be removed from the casing in the axial direction, thereby permitting easy removal of the plurality of magnetic pole modules.

In an example, each of the plurality of magnetic pole modules may include a plurality of receiving pits respectively located on an upper face and/or a lower face of the associated magnetic pole module. Each of the plurality of blocks may be located in one of the plurality of receiving pits. Thus, the push member can push the block from above or below, thereby permitting easy disassembly.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
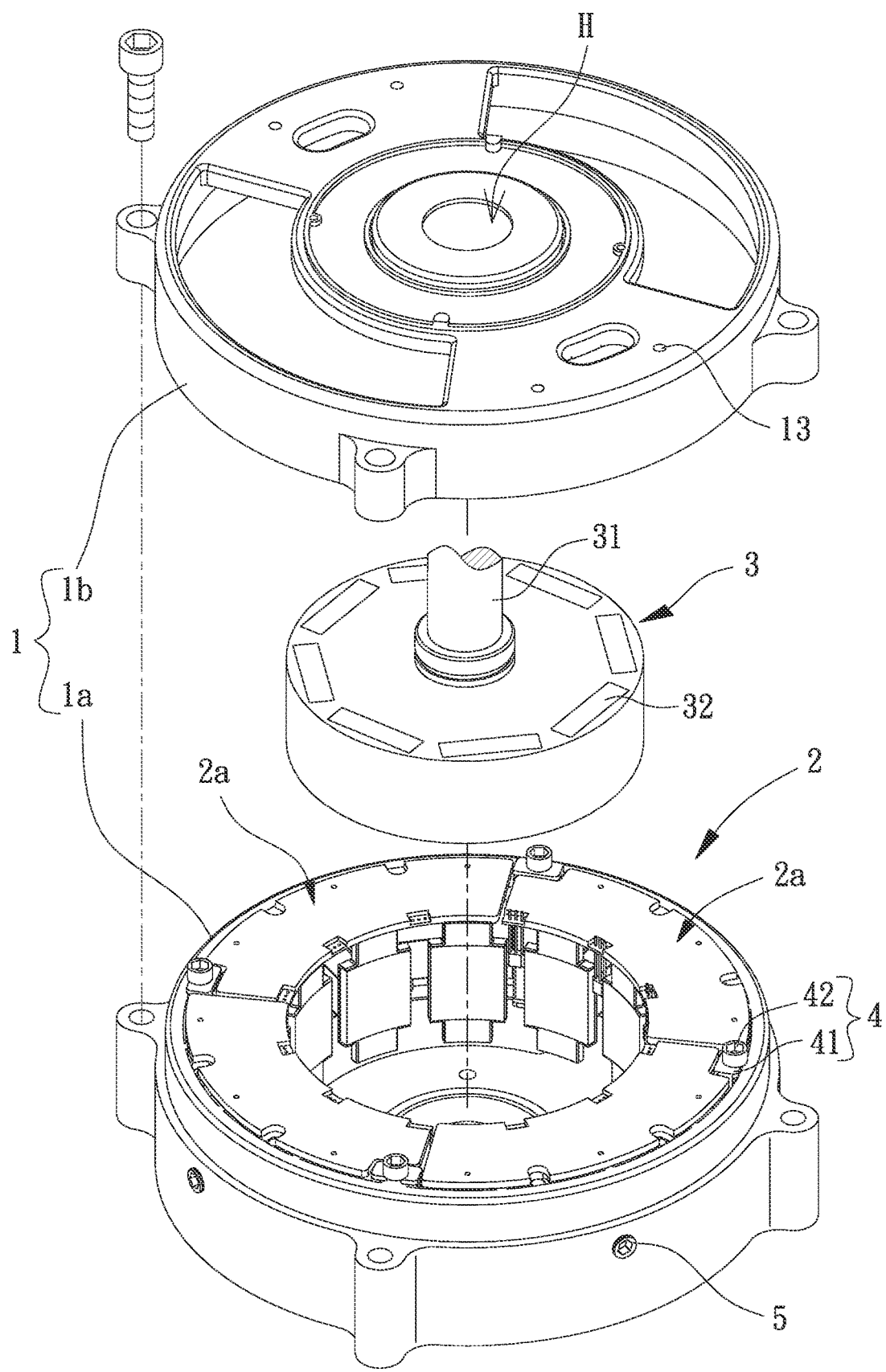
FIG. 1 is an exploded, perspective view of a motor of a first embodiment according to the present invention.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

With reference to FIG. 1, a motor of a first embodiment according to the present invention includes a casing 1, a stator 2, and a rotor 3. The stator 2 is disposed on the casing 1. The rotor 3 is rotatably disposed within the stator 2.

Figure 2:
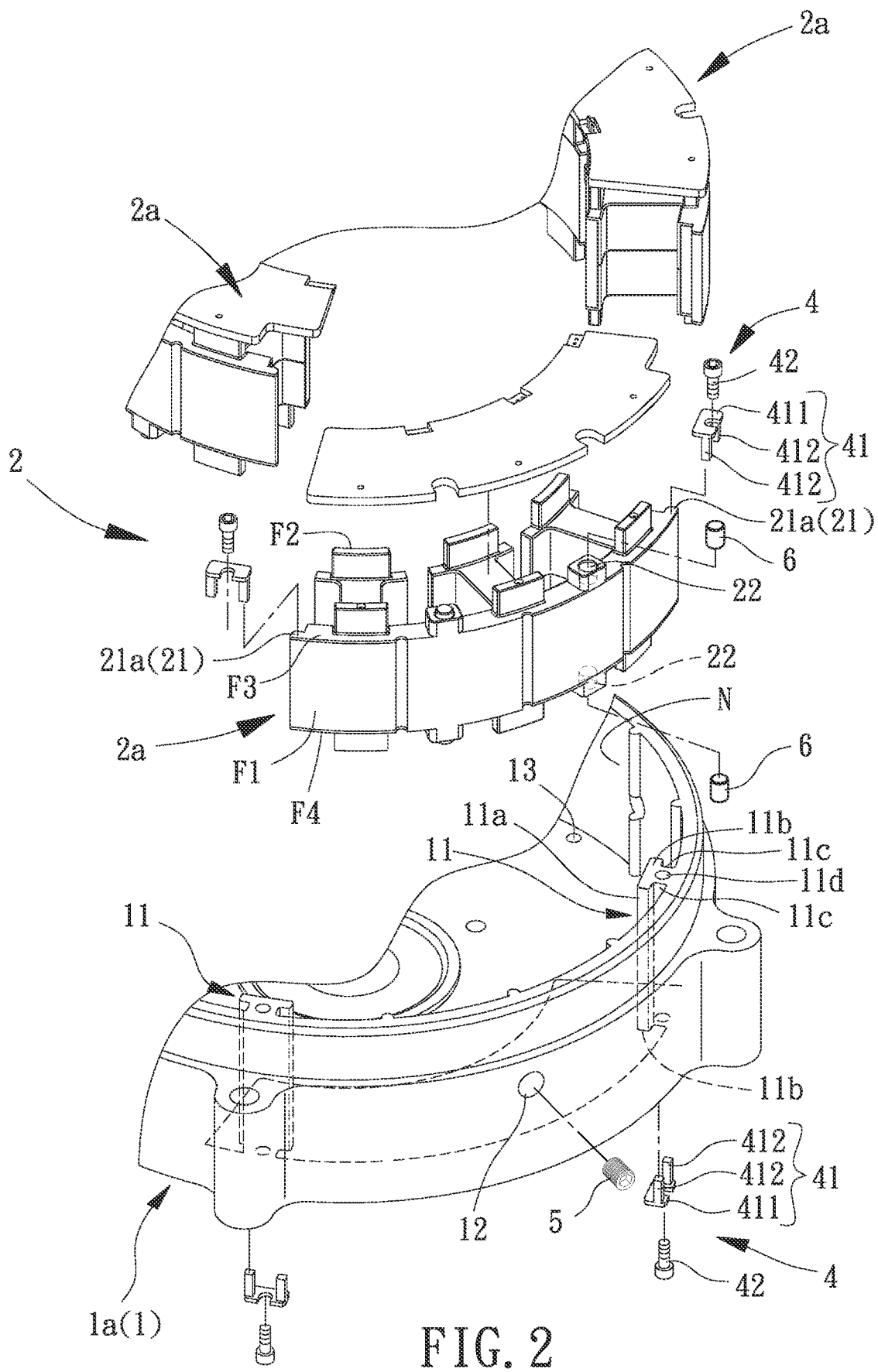
FIG. 2 is a partial, exploded, perspective view of the motor of the first embodiment according to the present invention.

With reference to FIGS. 1 and 2, the casing 1 may include a first casing part 1a and a second casing part 1b. The second casing part 1b may be coupled with the first casing part 1a to jointly envelope the stator 2. The coupling between the first casing part 1a and the second casing part 1b may be buckling, threading connection, welding, etc. The present invention is not limited in this regard. The casing 1 may include an axial hole H which may be located on the second casing part 1b. An inner periphery N of the casing 1 includes a plurality of first assembling structures 11 which may be located on the first casing part 1a. The plurality of first assembling structures 11 is spaced from each other and extends in an axial direction of the axial hole H. Each of the plurality of first assembling structures 11 may include a post 11a which may protrude from the inner periphery N of the casing 1. Each of the plurality of first assembling structures 11 may include two axial end faces 11b opposite to each other. The two axial end faces 11b are respectively located on top and bottom faces of the post 11a. The post 11a of each of the plurality of first assembling structures 11 includes two guiding grooves 11c extending through the two axial end faces 11b. The post 11a of each of the plurality of first assembling structures 11 may further include two engaging holes 11d. The two engaging holes 11d may be respectively formed on the two axial end faces 11b and may or may not intercommunicate with each other. The present invention is not limited in this regard. In this embodiment, the two engaging holes 11d may extend through the two axial end faces 11b, such that the two engaging holes 11d intercommunicate with each other. Furthermore, the two engaging holes 11d may be located between the two guiding grooves 11c.

Figure 6:
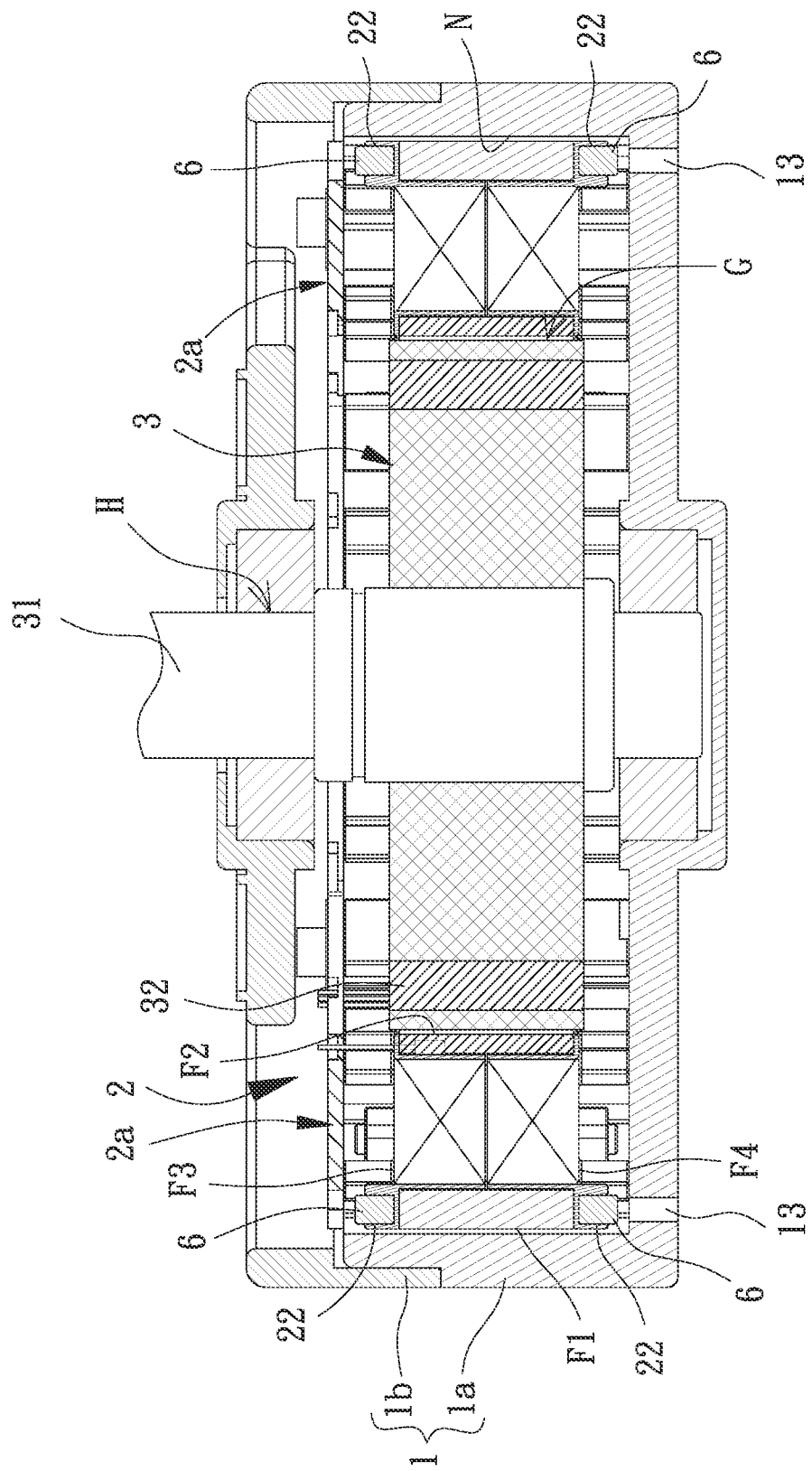
FIG. 6 is a cross sectional view taken along section line 6-6 of FIG. 4.

With reference to FIGS. 1, 2, and 6, the case 1 may include a plurality of radial through-holes 12 located on the first casing part 1a. Each of the plurality of radial through-holes 12 may be located between two adjacent first assembling structures 11. The casing 1 may include a plurality of through-holes 13. The plurality of through-holes 13 may be located on the first casing part 1a and the second casing part 1b, respectively. In this embodiment, each of the plurality of through-holes 13 is in the form of a screw hole for purpose of explanation.

With reference to FIG. 2, the stator 2 may include a plurality of magnetic pole modules 2a each of which can be independently separated. The motor may include plural-phase coils. As an example, the motor of this embodiment is a three-phase motor. Each of the plurality of magnetic pole modules 2a may include three-phase winding coils (not shown). Each of the plurality of magnetic pole modules 2a includes an outer face F1 and an inner face F2. Each outer face F1 is the face adjacent to an associated one of the plurality of first assembling structures 11. Each inner face F2 is the face remote from the associated first assembling structure 11. Each of the plurality of magnetic pole modules 2a includes an upper face F3 and a lower face F4 opposite to the upper face F3. Each of the plurality of magnetic pole modules 2a includes at least one second assembling structure 21. In this embodiment, each of the plurality of magnetic pole modules 2a includes two second assembling structures 21 respectively located on two sides of the magnetic pole module 2a. The two second assembling structures 21 are located between the outer face F1 and the inner face F2 and are nearer to the outer face F1. The two second assembling structures 21 are respectively aligned with two adjacent first assembling structures 11. Each second assembling structure 21 is detachably coupled to the two adjacent first assembling structures 11 in the axial direction. In this embodiment, each second assembling structure 21 may include a protrusion 21a which may be engaged with an associated one of the two guiding grooves 11c of an associated first assembling structure 11, such that the associated magnetic pole module 2a may be assembled between two adjacent first assembling structures 11. Furthermore, each of the plurality of magnetic pole modules 2a may include a plurality of receiving pits 22 respectively located on the upper face F3 and/or the lower face F4. The plurality of receiving pits 22 on the same magnetic pole module 2a may be located between the two second assembling structures 21, and the plurality of receiving pits 22 may be aligned with the plurality of through-holes 13 of the casing 1, respectively.

Figure 3:
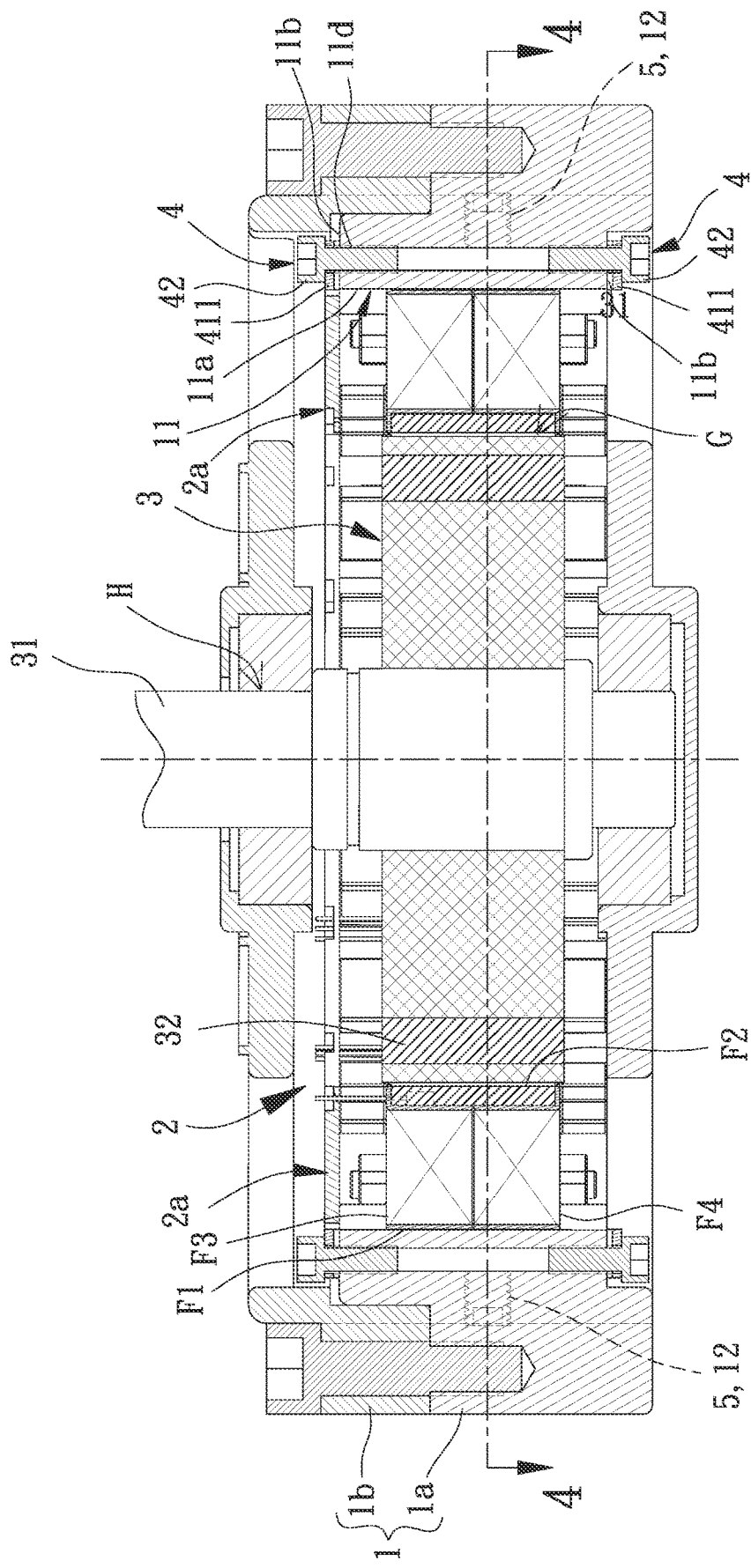
FIG. 3 is a cross sectional view of the motor of the first embodiment according to the present invention after assembly.
Figure 4:
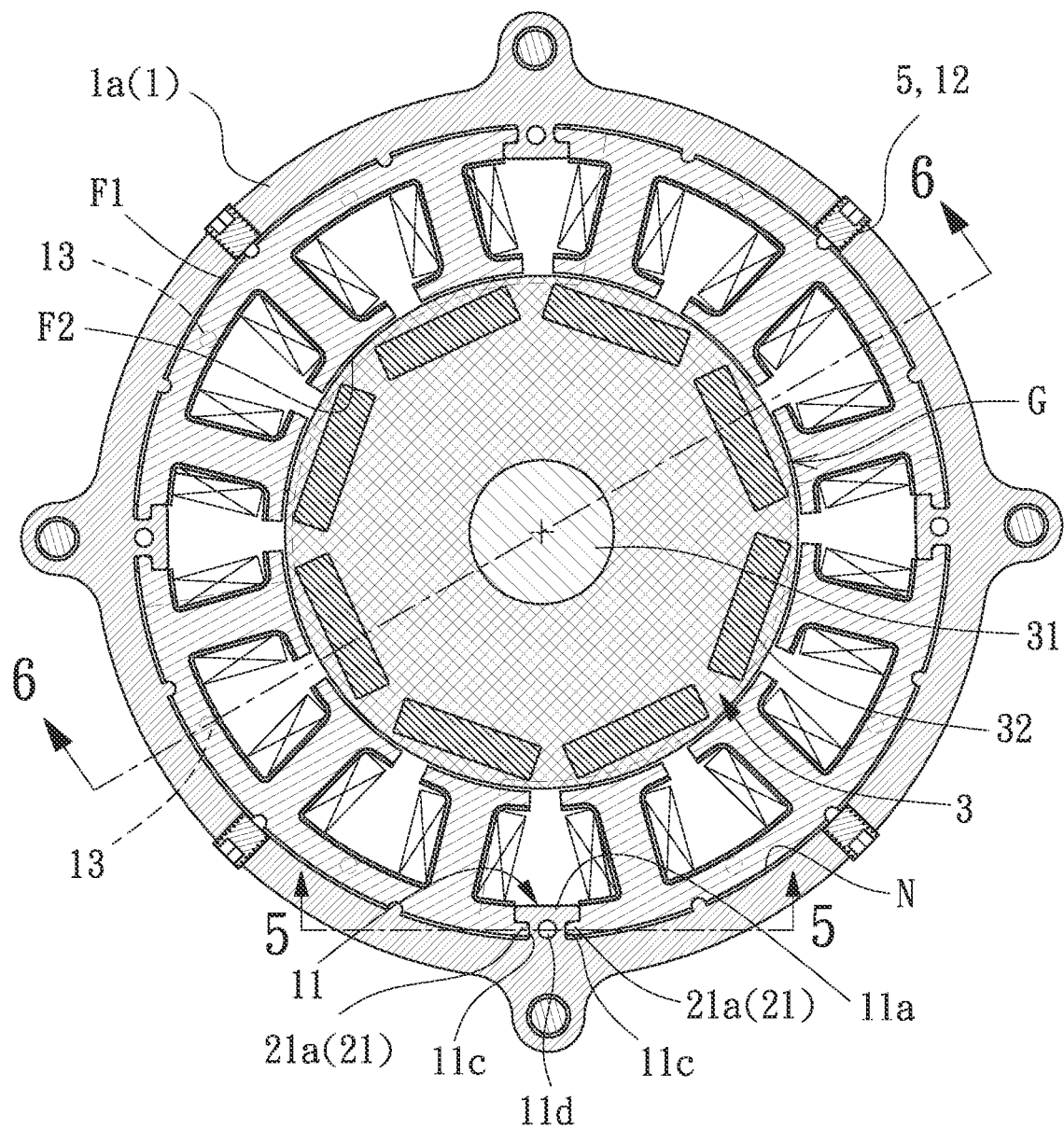
FIG. 4 is a cross sectional view taken along section line 4-4 of FIG. 3.

With reference to FIGS. 1, 3, and 4, the rotor 3 may include a shaft 31 and a magnet portion 32. An end of the shaft 31 passes through the axial hole H of the casing 1 and extends beyond the second casing part 1b. The magnet portion 32 is disposed around the shaft 31. The magnet portion 32 may be, e.g., coupled to the shaft 31 via a base, and the base includes a plurality of annularly disposed magnets, or any other equivalent structures. The present invention is not limited in this regard. The magnet portion 32 of the rotor 3 and the inner face F2 of the plurality of magnetic pole modules 2a of the stator 2 have an air gap G formed therebetween. Thus, the magnet portion 32 may proceed with magnetic induction with the plurality of magnetic pole modules 2a to drive the shaft 31 to rotate relative to the stator 2.

Figure 5:
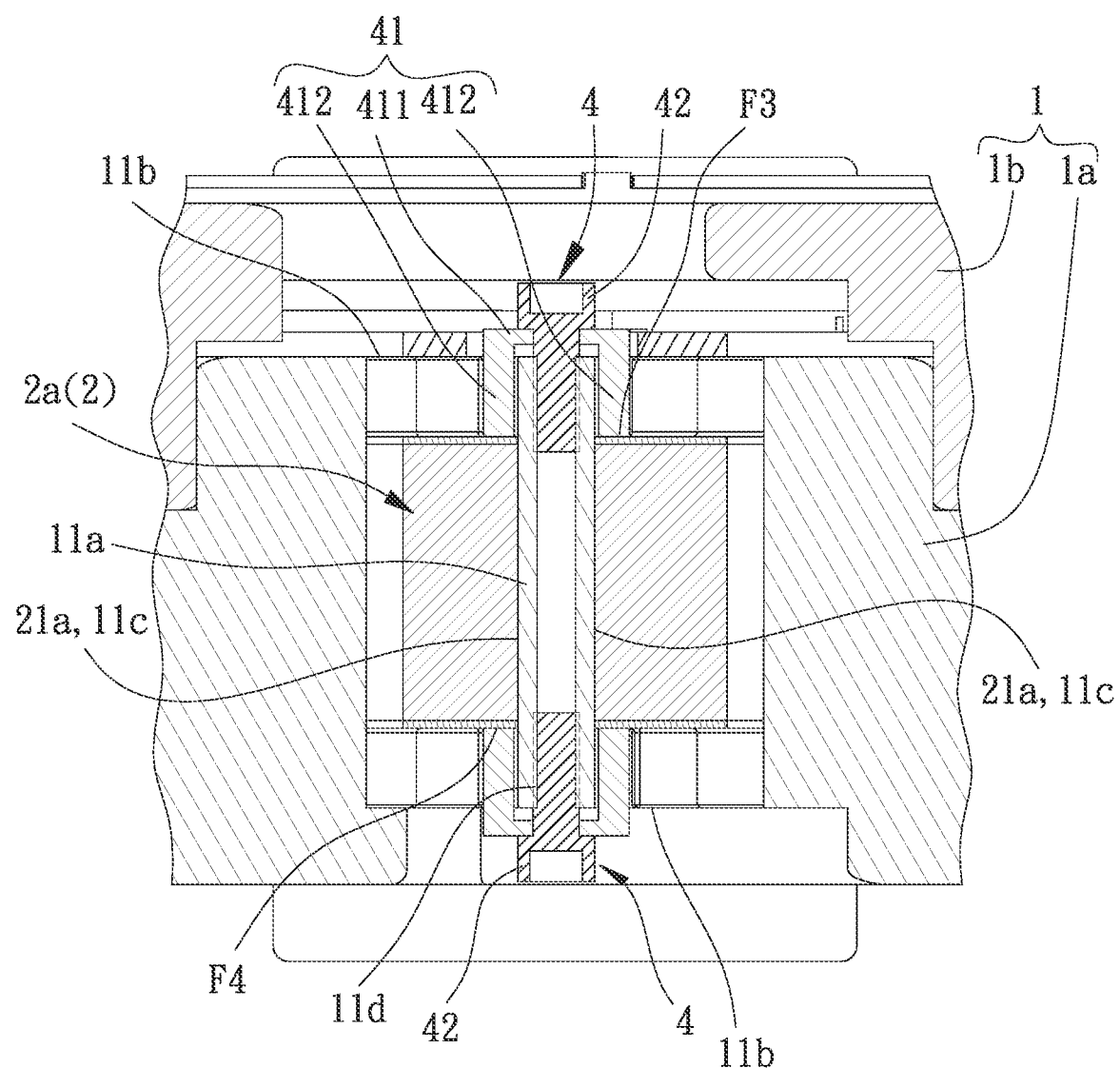
FIG. 5 is a cross sectional view taken along section line 5-5 of FIG. 4.

With reference to FIGS. 2 and 5, the motor according to the present invention further includes a plurality of fixing units 4 axially coupled with the casing 1 and the stator 2. Each of the plurality of fixing units 4 may include a pressing member 41 and a positioning member 42. Each pressing member 41 may include a padding portion 411 and two pressing portions 412. Each padding portion 411 may be coupled with one of the two axial end faces 11b of an associated first assembling structure 11. In this embodiment, the padding portion 411 does not abut the axial end face 11b of the first assembling structure 11. In another embodiment, the padding portion 411 may abut an associated axial end face 11b of the first assembling structure 11. The two pressing portions 412 are connected to the padding portion 411, extend into the two guiding grooves 11c of the first assembling structure 11, and press against an upper face F3 or a lower face F4 of an associated second assembling structure 21. The positioning member 42 extends through the padding portion 411 and engages with an engaging hole 11d of an associated first assembling assembly 11, such that the plurality of magnetic pole modules 2a can be stably coupled with the casing 1, thereby effectively preventing the plurality of magnetic pole modules 2a from displacing relative or falling from the casing 1.

With reference to FIGS. 2 and 3, the motor according to the present invention may further comprise a plurality of fasteners 5. The plurality of fasteners 5 respectively extends through the plurality of radial through-holes 12 of the casing 1. The plurality of fasteners 5 may be in threading connection with the plurality of radial through-holes 12. Furthermore, the plurality of fasteners 5 may press against the outer faces F1 of the plurality of magnetic pole modules 2a, respectively, such that the plurality of magnetic pole modules 2a may be stably coupled with the casing 1. As a result, the stator 2 after assembly will not rotate relative to the casing 1, thereby effectively preventing the plurality of magnetic pole modules 2a from displacing relative to or falling from the casing 1.

Figure 7:
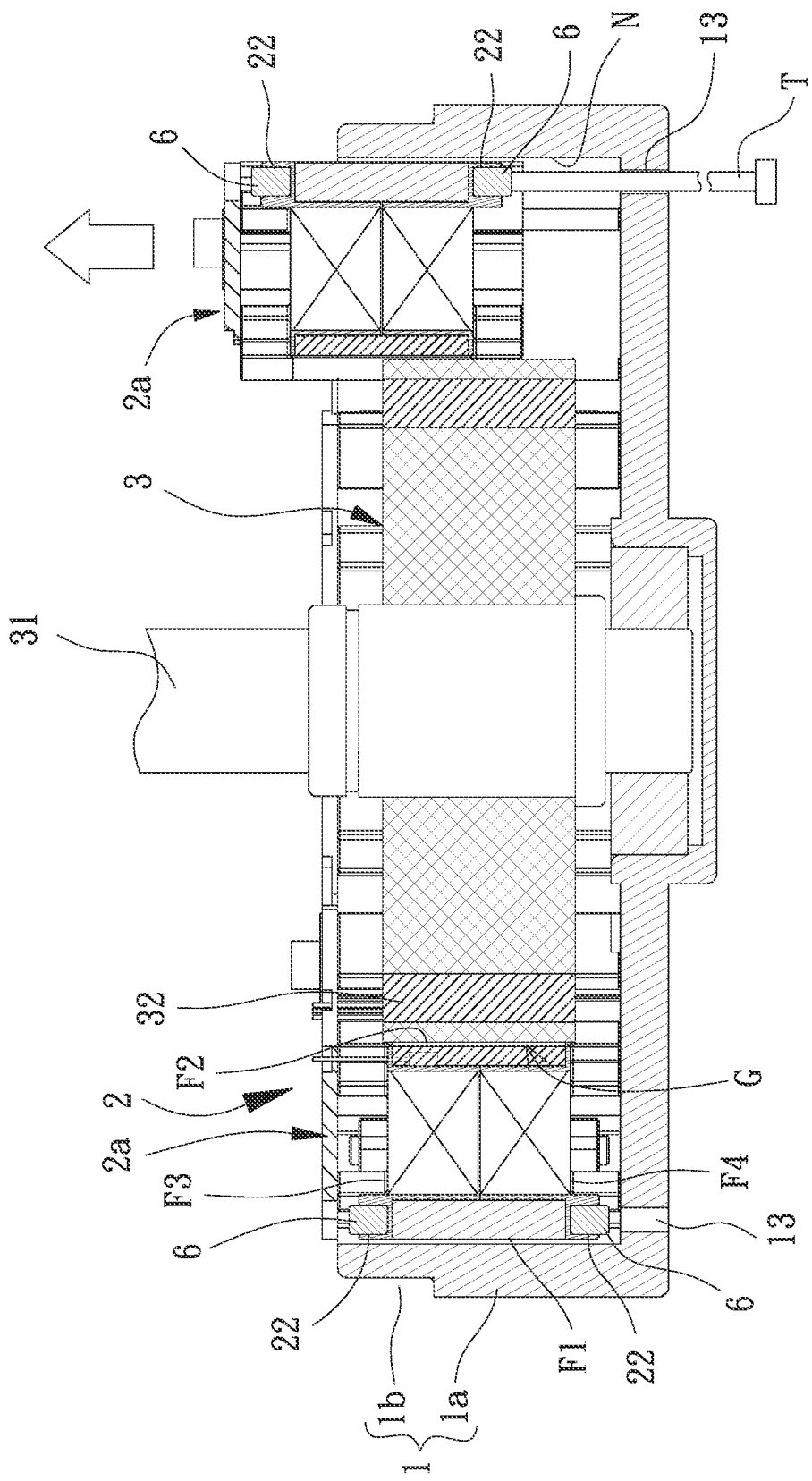
FIG. 7 is a cross sectional view similar to FIG. 6, illustrating disassembly of a magnetic pole module of the motor of the first embodiment according to the present invention.

With reference to FIGS. 6 and 7, the motor according to the present invention may further include a plurality of blocks 6. Each of the plurality of blocks 6 may be made of metal. Each of the plurality of blocks 6 may be located in one of the plurality of receiving pits 22 of an associated magnetic pole module 2a, such that the plurality of blocks 6 may be aligned with the plurality of through-holes 13, respectively. Each of the plurality of blocks 6 may be engaged in an associated receiving pit 22 by integral molding injection to permit easy manufacturing. Therefore, a push member T may be used to extend through one of the plurality of through-holes 13 of the casing 1 and to push one of the plurality of blocks 6, such that the associated magnetic pole module 2a may displace axially relative to the casing 1 to permit removal of the magnetic pole module 2a, which permits easy maintenance or replacement of the magnetic pole module 2a. It is particularly noted that each push member T may be in the form of a screw to be in threading connection with the associated through-hole 13, permitting the push member T to easily push the associated push block 6.

With reference to FIGS. 2 and 3, when the stator 2 is energized, the plurality of magnetic pole modules 2a of the stator 2 and the magnetic portion 32 form repulsive magnetic poles to drive the rotor 3 to rotate. After the motor according to the present invention has been used for a period of time, since the stator 2 includes a plurality of independently separable magnetic pole modules 2a and since each second assembling structure 21 is detachably coupled to an associated one of the plurality of first assembling structures 11 in the axial direction, when one of the plurality of magnetic pole modules 2a of the stator 2 is damaged, the damaged magnetic pole module 2a can be removed alone, and replacement or maintenance can be achieved by simply removing the coil unit (not shown) on the damaged magnetic pole unit 2a. After maintenance, the repaired magnetic pole module 2a is remounted to the casing 1. By the provision of each second assembling structure 21 detachably coupled to an associated first assembling structure 11 in the axial direction, adverse influence on the size and location of the magnetic pole modules 2a near the repaired magnetic pole module 2a can be avoided, permitting easy assembly and disassembly.

Figure 8:
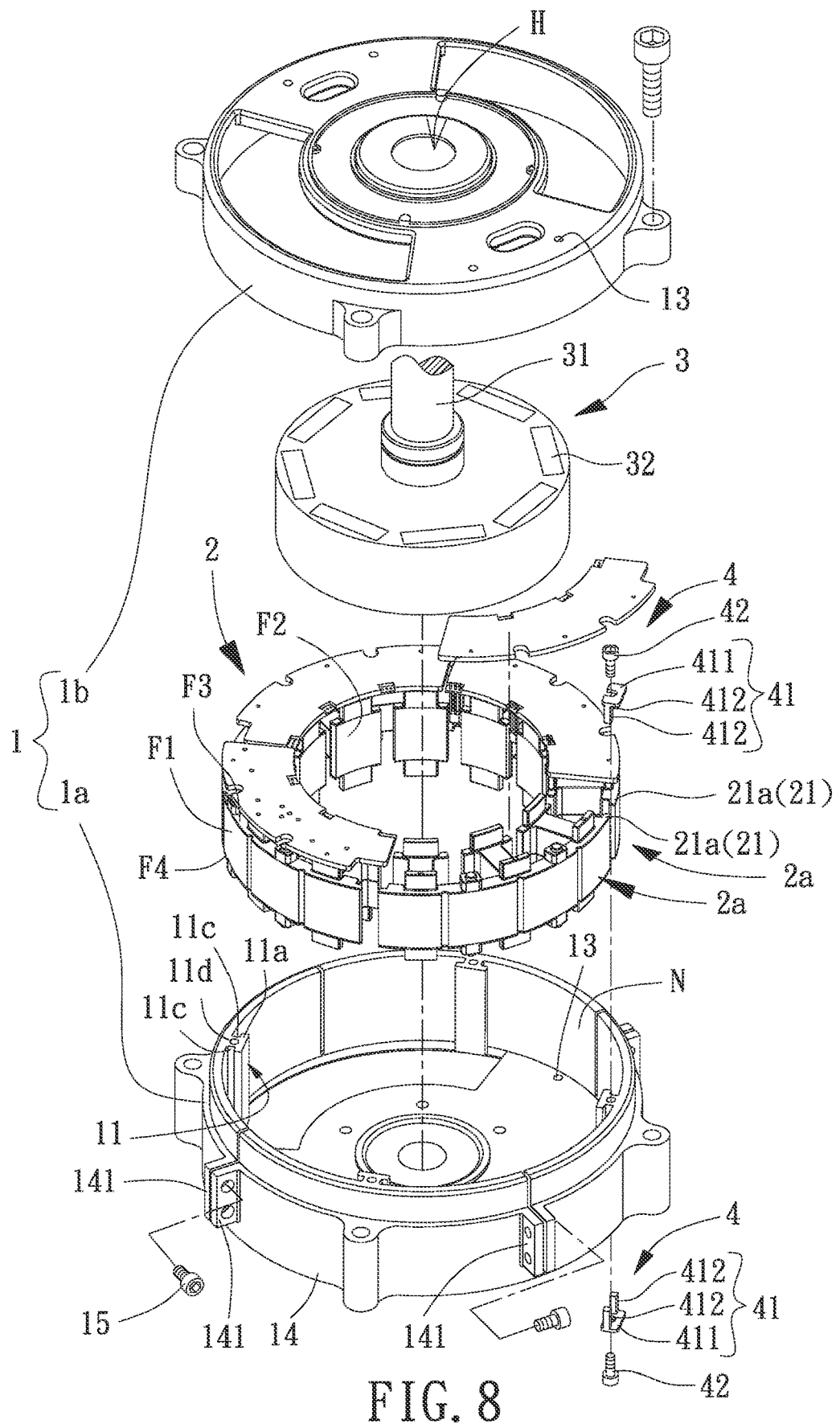
FIG. 8 is an exploded, perspective view of a motor of a second embodiment according to the present invention.

Please refer to FIG. 8 showing a motor of a second embodiment according to the present invention. The second embodiment of the present invention is substantially the same as the first embodiment. In the second embodiment, the casing 1 includes a first casing part 1a formed of a plurality of arcuate blocks 14 connected to each other. Each of the plurality of arcuate blocks 14 includes two lugs 141. Each of the two lugs 141 of each of the plurality of arcuate blocks 14 is aligned with one of the two lugs 141 of an adjacent arcuate block 14. Each pair of aligned lugs 141 is coupled by a fastening unit 15. Thus, the plurality of arcuate blocks 14 may together tightly clamp the plurality of magnetic pole modules 2a of the stator 2, further avoiding the plurality of magnetic pole modules 2a from becoming loose.

Figure 9:
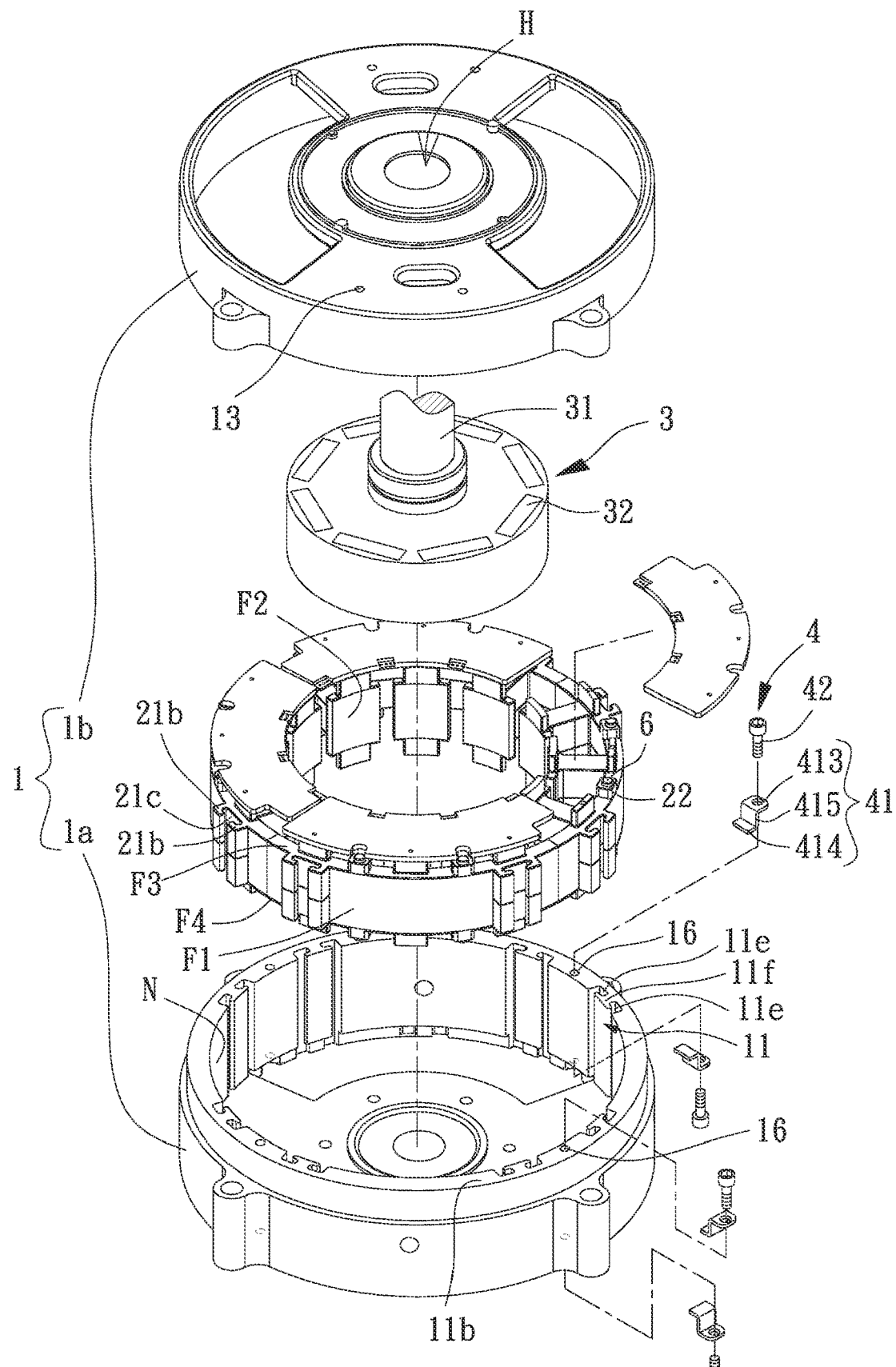
FIG. 9 is an exploded, perspective view of a motor of a third embodiment according to the present invention.
Figure 10:
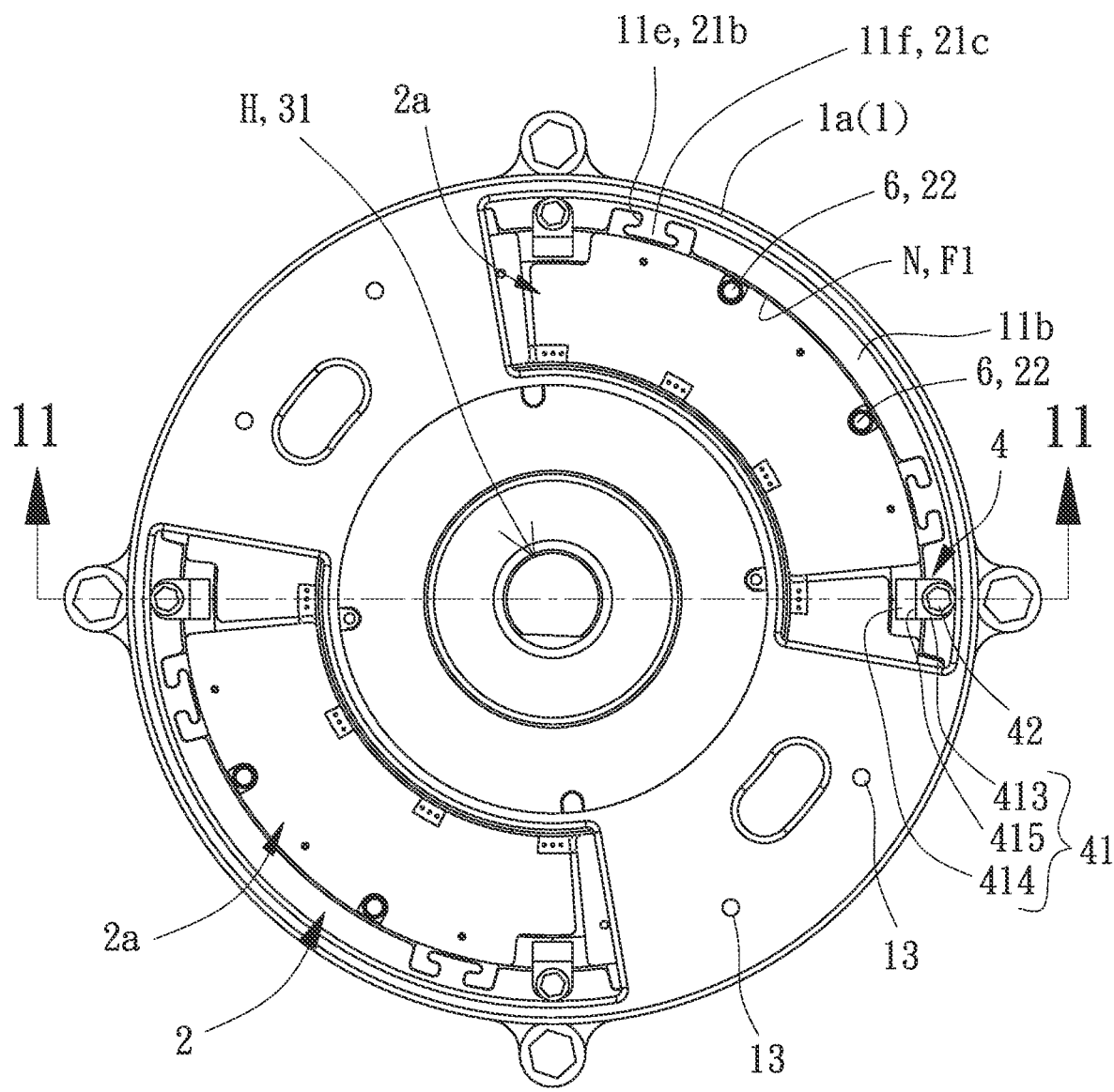
FIG. 10 is a top view of the motor of the third embodiment according to the present invention.
Figure 11:
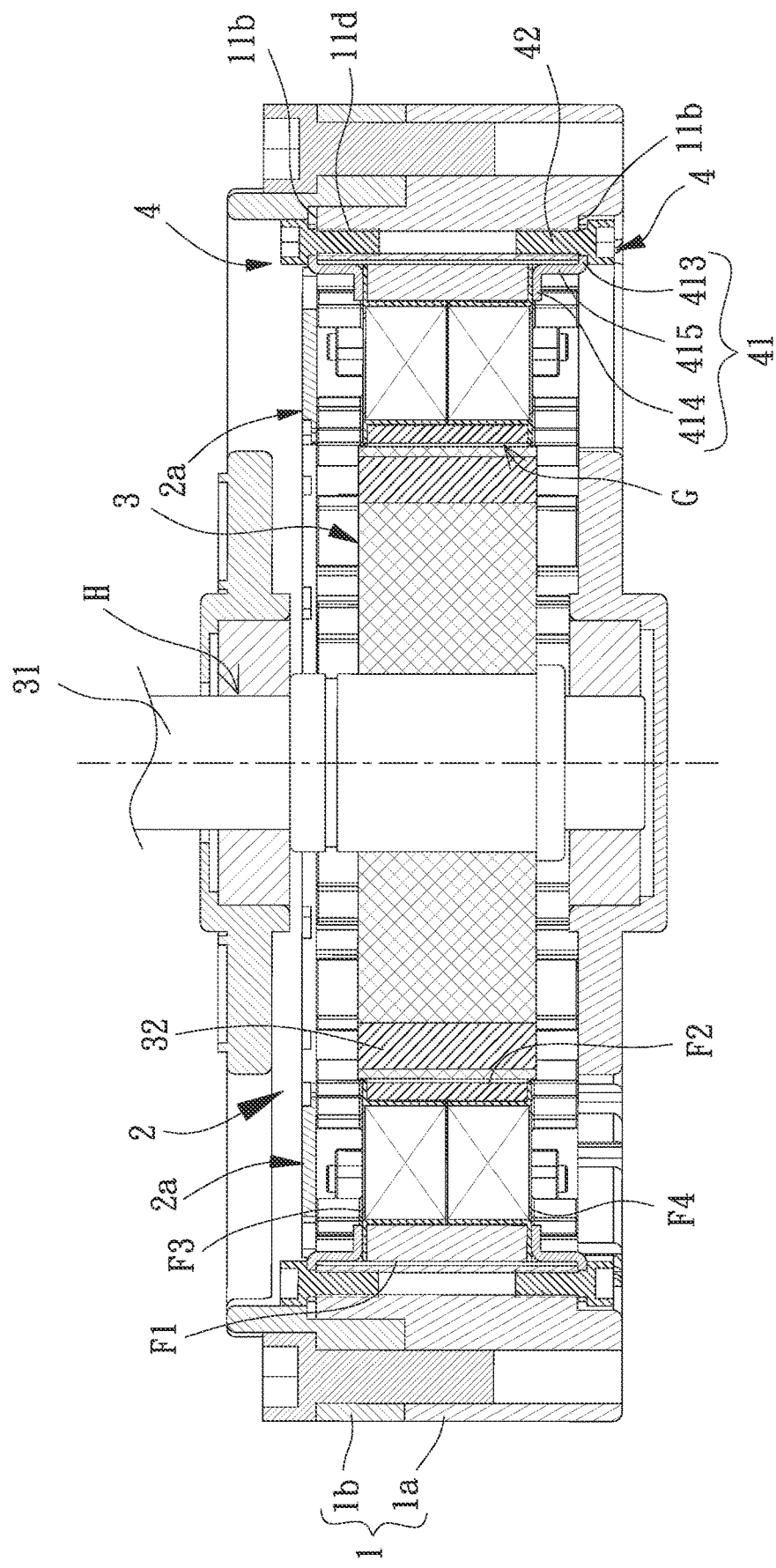
FIG. 11 is a cross sectional view taken along section line 11-11 of FIG. 10.

Please refer to FIGS. 9-11 showing a motor of a third embodiment according to the present invention. The third embodiment of the present invention is substantially the same as the first embodiment. In the third embodiment, each of the plurality of first assembling structures 11 may include two channels 11e which may be recessed in the inner periphery N of the casing 1. A limiting column 11f may be formed between the two channels 11e. Each limiting column 11f may be substantially T-shaped. Furthermore, each second assembling structure 21 of the stator 2 may be formed on the outer face F1 of the associated magnetic pole module 2a. Each second assembling structure 21 may include two hooked columns 21b which may protrude beyond the outer face F1. A limiting groove 21c may be formed between the two hooked columns 21b. The two hooked columns 21b may engage with the two channels 11e of an associated first assembling structure 11. The limiting column 11f may engage with the limiting groove 21c of an associated second assembling structure 21. Therefore, each of the plurality of magnetic pole modules 2a may be axially and detachably coupled to two adjacent first assembling structures 11 by the two second assembling structures 21. As a result, by providing each second assembling structure 21 axially and detachably coupled to an associated first assembling structure 11, when one of the plurality of magnetic pole modules 2a of the stator 2 is damaged, the damaged magnetic pole module 2a may be removed alone for replacement or maintenance.

Furthermore, each pressing member 41 may include a padding board portion 413 and a pressing board portion 414. A connecting board 415 is connected between the padding board portion 413 and the pressing board portion 414. In this embodiment, the pressing member 41 may be in the form of a Z-shaped piece. Each padding board portion 413 may engage one of the two axial end faces 11b of an associated first assembling structure 11. In this embodiment, each padding board portion 413 abuts an axial end face 11b of an associated first assembling structure 11 for purpose of explanation. In another embodiment, each padding board portion 413 may not abut the axial end face 11b of the associated first assembling structure 11. Each pressing board portion 414 may press against an upper face F3 or a lower face F4 of an associated second assembling structure 21. The positioning member 42 may extend through the padding board portion 413 and engage with a mounting hole 16 of the casing 1, such that the plurality of magnetic pole modules 2a can be stably coupled to the casing 1, thereby effectively preventing the plurality of magnetic pole modules 2a from displacing relative to or falling from the casing 1.

Figure 12:
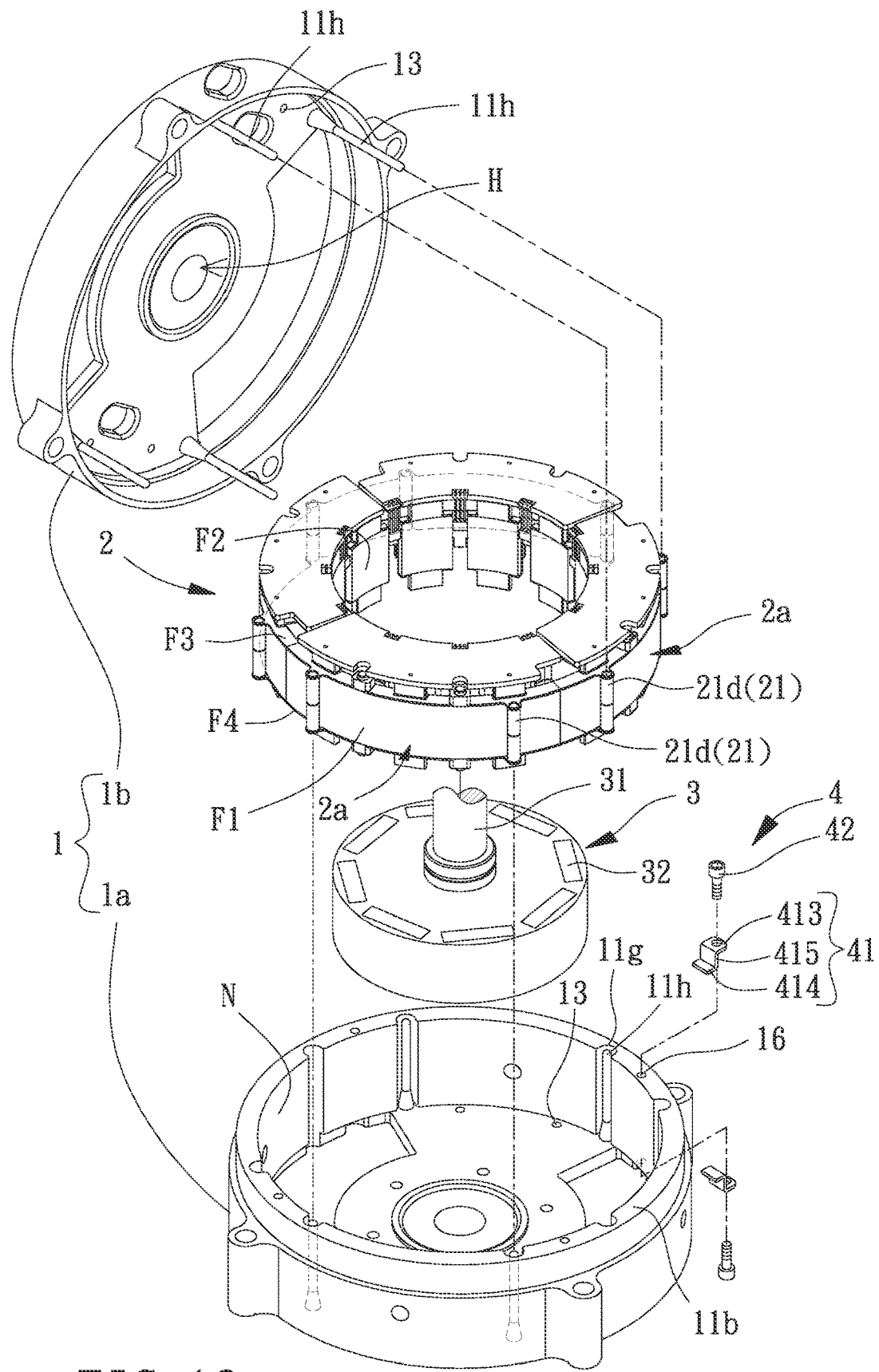
FIG. 12 is an exploded, perspective view of a motor of a fourth embodiment according to the present invention.

Please refer to FIG. 12 showing a motor of a fourth embodiment according to the present invention. The fourth embodiment of the present invention is substantially the same as the third embodiment. In the fourth embodiment, each of the plurality of first assembling structures 11 may include a slot 11g and a pin 11h. Each slot 11g may be recessed in the inner periphery N of the casing 1. The pins 11h may be disposed on the first casing part 1a and the second casing part 1b. Each pin 11h located on the first casing part 1a includes an end connected to the first casing part 1a and another end facing the second casing part 1b. Each pin 11h on the first casing part 1a is located in an associated slot 11g. Furthermore, each pin 11h located on the second casing part 1b includes an end connected to the second casing part 1b and another end facing the first casing part 1a. Moreover, the pins 11h on the first casing part 1a are misaligned from the pins 11h on the second casing part 1b. Each second assembling structure 21 of the stator 2 is located on the outer face F1 of an associated magnetic pole module 2a. Each second assembling structure 21 may include a hollow column 21d. Each hollow column 21d may be aligned with an associated pin 11h. In assembly, the hollow column 21d of the second assembling structure 21 is axially coupled with a pin 11h of the first casing part ha aligned with the hollow column 21d. Then, the pin 11h of the second casing part 1b is axially coupled with a hollow column 21d of the second assembling structure 21 aligned with the pin 11h, such that the pins 11h may respectively extend into the hollow columns 21d of the second assembling structures 21. Therefore, by the provision of each second assembling structure 21 axially and detachably coupled to an associated first assembling structure 11, when one of the plurality of magnetic pole modules 2a of the stator 2 is damaged, the damaged magnetic pole module 2a may be removed alone for replacement or maintenance.

In summary, in the motor according to the present invention, the stator includes a plurality of independently separable magnetic pole modules each having at least one second assembling structure. Each magnetic pole module is axially and detachably coupled to the casing by coupling each second assembling structure to an associated first assembling structure of the casing. When one of the plurality of magnetic pole modules of the stator is damaged, the damaged magnetic pole module may be removed alone for replacement or maintenance. After maintenance, by the provision of each second assembling structure and the associated first assembling structure, the repaired magnetic pole module can be easily reassembled to the casing, which may avoid adverse influence on the arrangement of the other magnetic pole modules near the repaired magnetic pole module, permitting easy assembly and disassembly.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor comprising:
a casing including an inner periphery having a plurality of first assembling structures;
a stator disposed on the casing and including a plurality of magnetic pole modules, wherein each of the plurality of magnetic pole modules is independently separable, wherein each of the plurality of magnetic pole modules includes at least one second assembling structure, and wherein each of the plurality of magnetic pole modules is detachably coupled in an axial direction to the casing by coupling each of the at least one second assembling structure to an associated one of the plurality of first assembling structures;
a rotor rotatably disposed within the stator, wherein an air gap is formed between the rotor and the stator; and
a plurality of fixing units axially coupled with the casing and the stator;
wherein each of the plurality of first assembling structures includes a post having two axial end faces opposite to each other, wherein the post of each of the plurality of first assembling structures includes two guiding grooves extending through the two axial end faces, wherein each second assembling structure includes a protrusion engaged with an associated one of the two guiding grooves of an associated first assembling structure;
wherein each of the plurality of fixing units includes a pressing member and a positioning member, wherein each pressing member includes a padding portion and two pressing portions, wherein the two pressing portions are connected to the padding portion, extend into the two guiding grooves of the first assembling structure, and press against an upper face or a lower face of an associated second assembling structure, and wherein the positioning member extends through the padding portion and engages with an engaging hole of an associated one of the plurality of first assembling structures.

2. The motor as claimed in claim 1, wherein each of the plurality of magnetic pole modules includes an outer face and an inner face, wherein each outer face is adjacent to an associated one of the plurality of first assembling structures, and wherein each inner face is remote from the associated first assembling structure.

3. The motor as claimed in claim 1, wherein the post of each of the plurality of first assembling structures includes two engaging holes respectively formed on the two axial end faces, and wherein the two engaging holes are located between the two guiding grooves.

4. The motor as claimed in claim 1, wherein the casing includes a first casing part formed of a plurality of arcuate blocks connected to each other, and wherein the plurality of arcuate blocks together tightly clamp the plurality of magnetic pole modules of the stator.

5. The motor as claimed in claim 4, wherein each of the plurality of arcuate blocks includes two lugs, wherein each of the two lugs of each of the plurality of arcuate blocks is aligned with one of the two lugs of an adjacent arcuate block, and wherein each pair of aligned lugs is coupled by a fastening unit.

6. The motor as claimed in claim 1, further comprising a plurality of fasteners, wherein the plurality of fasteners extends through the casing and presses against the plurality of magnetic pole modules, respectively.

7. The motor as claimed in claim 6, wherein the casing includes a plurality of radial through-holes, and wherein the plurality of fasteners extends through and engages with the plurality of radial through-holes, respectively.

8. The motor as claimed in claim 1, further comprising a plurality of blocks, wherein each of the plurality of blocks is disposed on an associated one of the plurality of magnetic pole modules, and wherein a push member extends through a through-hole of the casing and is configured to push one of the plurality of blocks.

9. The motor as claimed in claim 8, wherein each of the plurality of magnetic pole modules includes a plurality of receiving pits respectively located on an upper face and/or a lower face of the associated magnetic pole module, and wherein each of the plurality of blocks is located in one of the plurality of receiving pits.

* * * * *